United States Patent
Battaglini et al.

(10) Patent No.: US 9,413,864 B2
(45) Date of Patent: Aug. 9, 2016

(54) CONTROLLING MUTE FUNCTION ON TELEPHONE

(71) Applicant: International Business Machines Corporation, Armonk, NY (US)

(72) Inventors: Roberto Battaglini, New York, NY (US); Brian P. Singer, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 14/289,732

(22) Filed: May 29, 2014

(65) Prior Publication Data

US 2014/0270151 A1 Sep. 18, 2014

Related U.S. Application Data

(63) Continuation of application No. 11/189,294, filed on Jul. 26, 2005, now Pat. No. 8,787,866.

(51) Int. Cl.
| | |
|---|---|
| *H04M 3/00* | (2006.01) |
| *H04M 1/19* | (2006.01) |
| *H04M 1/247* | (2006.01) |
| *H04M 1/60* | (2006.01) |

(52) U.S. Cl.
CPC ............... *H04M 1/19* (2013.01); *H04M 1/247* (2013.01); *H04M 1/6033* (2013.01); *H04M 1/6008* (2013.01); *H04M 2250/74* (2013.01)

(58) Field of Classification Search
CPC .................... H04M 2201/40; H04M 1/271
USPC .............. 455/414.1, 563; 379/88.01, 406.03
See application file for complete search history.

(56) References Cited

U.S. PATENT DOCUMENTS

| | | |
|---|---|---|
| 5,229,764 A | 7/1993 | Matchett et al. |
| 6,212,275 B1 | 4/2001 | Akhteruzzaman |
| 6,493,670 B1 | 12/2002 | Croft |
| 6,785,647 B2 | 8/2004 | Hutchison |
| 6,870,919 B2 | 3/2005 | Dobler |
| 7,292,678 B2 | 11/2007 | Glynn et al. |
| 2002/0107694 A1* | 8/2002 | Lerg ........................ B60C 23/06 704/273 |

(Continued)

OTHER PUBLICATIONS

Voice Activity Detection, from Wikipedia, retrieved from Internet on Feb. 25, 2009, <http:en.wikipedia.org/wiki/voice_activity_detection>, 4 pages.

(Continued)

*Primary Examiner* — Vladimir Magloire
*Assistant Examiner* — Frank Donado
(74) *Attorney, Agent, or Firm* — Schmeiser, Olsen & Watts, LLP; William H. Hartwell

(57) ABSTRACT

A telephone device and a method and for controlling a mute function in the telephone device. While the mute function is active, voice recognition software in the telephone device processes sound detected by a microphone in the telephone device to recognize and identify one or more specific words as having been spoken by a specific person and not by another person, and in response, the telephone device activates an alarm in the telephone device to communicate that the mute function is active. The voice recognition software was trained, prior to the sound having been detected, to differentiate the one or more specific words spoken by the specific person from the same one or more specific words spoken by other people.

9 Claims, 4 Drawing Sheets

(56) References Cited

U.S. PATENT DOCUMENTS

| | | |
|---|---|---|
| 2003/0104800 A1 | 6/2003 | Zak |
| 2003/0185371 A1* | 10/2003 | Dobler .................. H04M 1/247 379/207.02 |
| 2003/0194072 A1 | 10/2003 | MacNamara et al. |
| 2004/0127198 A1 | 7/2004 | Roskind et al. |
| 2004/0186712 A1* | 9/2004 | Coles ...................... G10L 15/26 704/235 |
| 2006/0280295 A1* | 12/2006 | Runcie .................. H04M 1/247 379/88.26 |

OTHER PUBLICATIONS

Notice of Allowance (mail date Mar. 14, 2014) for U.S. Appl. No. 11/189,294, filed Jul. 26, 2005, Conf. No. 3375.
Examinier's Answer {mail date Nov. 30, 2010) for U.S. Appl. No. 11/189,294, filed Jul. 26, 2005, Conf. No. 3375.
Appeal Brief (filed Sep. 2, 2010) for U.S. Appl. No. 11/189,294, filed Jul. 26, 2005, Conf. No. 3375.
Notice of Appeal (filed Sep. 1, 2010) for U.S. Appl. No. 11/189,294, filed Jul. 26, 2005, Conf. No. 3375.
Office Action (mail date Jun. 10, 2010) for U.S. Appl. No. 11/189,294, filed Jul. 26, 2005, Conf. No. 3375.
Appeal Brief (filed Mar. 3, 2010) for U.S. Appl. No. 11/189,294, filed Jul. 26, 2005, Conf. No. 3375.
Appeal Brief (filed Feb. 9, 2010) for U.S. Appl. No. 11/189,294, filed Jul. 26, 2005, Conf. No. 3375.
Advisory Action (mail date Feb. 5, 2010) for U.S. Appl. No. 11/189,294, filed Jul. 26, 2005, Conf. No. 3375.
Notice of Appeal (filed Jan. 12, 2010) for U.S. Appl. No. 11/189,294, filed Jul. 26, 2005, Conf. No. 3375.
Final Amendment (filed Jan. 11, 2010) for U.S. Appl. No. 11/189,294, filed Jul. 26, 2005, Conf. No. 3375.
Final Office Action (mail date Nov. 13, 2009) for U.S. Appl. No. 11/189,294, filed Jul. 26, 2005, Conf. No. 3375.
Amendment (filed May 15, 2009) for U.S. Appl. No. 11/189,294, filed Jul. 26, 2005, Conf. No. 3375.
Office Action (mail date Feb. 19, 2009) for U.S. Appl. No. 11/189,294, filed Jul. 26, 2005, Conf. No. 3375.
RCE (filed Jan. 23, 2009) for U.S. Appl. No. 11/189,294, filed Jul. 26, 2005, Conf. No. 3375.
Notice of Appeal (filed Dec. 18, 2008) for U.S. Appl. No. 11/189,294, filed Jul. 26, 2005, Conf. No. 3375.
Advisory Action (mail date Dec. 11, 2008) for U.S. Appl. No. 11/189,294, filed Jul. 26, 2005, Conf. No. 3375.
Final Amendment (filed Nov. 25, 2008) for U.S. Appl. No. 11/189,294, filed Jul. 26, 2005, Conf. No. 3375.
Final Office Action (mail date Oct. 3, 2008) for U.S. Appl. No. 11/189,294, filed Jul. 26, 2005, Conf. No. 3375.
Amendment (filed Jul. 9, 2008) for U.S. Appl. No. 11/189,294, filed Jul. 26, 2005, Conf. No. 3375.
Office Action (mail date May 13, 2008) for U.S. Appl. No. 11/189,294, filed Jul. 26, 2005, Conf. No. 3375.

* cited by examiner

CONTROLLING MUTE FUNCTION ON TELEPHONE

This application is a continuation application claiming priority to Ser. No. 11/189,294, filed Jul. 26, 2005, now U.S. Pat. No. 8,787,866 issued Jul. 22, 2014.

FIELD OF INVENTION

The present invention relates generally to telephones, and more particularly to control of a mute function on a telephone or other audio communication device.

BACKGROUND

It is known for a telephone to include a mute function, typically activated by a user pressing a mute button on the telephone. Once the mute function is activated, speech or other sounds reaching the telephone will not pass through to other people on a call. The mute function is typically (but not always) used when the telephone is operating in a "speaker" mode, where a microphone in the telephone base unit is activated (instead of a microphone in the handset). The mute function is typically used in a conference call at times when the user is not expected to speak, although it could be used as well in a call with only one other person. Occasionally, while the mute function is active, the user will attempt to speak to the other person or people on the call, forgetting that the mute function is active. Because mute function is active, the other person or people will not hear the words spoken by the user. When the user realizes that the mute function is active, the user will need to repeat the previously muted words.

U.S. Pat. No. 6,870,919 discloses a telephone with a mute function, and a notification unit which determines when a user is speaking while the mute function is active. In such a case, the telephone or a computer provides a mute status reminder to the user. The mute status reminder may be a tone or prerecorded message. U.S. Pat. No. 6,870,919 also discloses activation of the mute status reminder when the communication signal exceeds a predetermined energy level.

An object of the present invention is to avoid unnecessary mute status reminders.

SUMMARY

The present invention resides in a system, method and program for controlling a mute function on a telephone device. While the mute function is active, sound reaching a telephone or other communication device is sensed, and a determination is made if the sound includes a word. If so, an alarm is activated to alert a user that the mute function is active. If not, the alarm is not activated.

In accordance with an optional feature of the present invention, speech recognition software is trained to recognize the voice or speech pattern of a specific user, and the alarm is activated only if the word was spoken by the specific user.

DETAILED DESCRIPTION OF THE PREFERRED EMBODIMENTS

Figure 1:
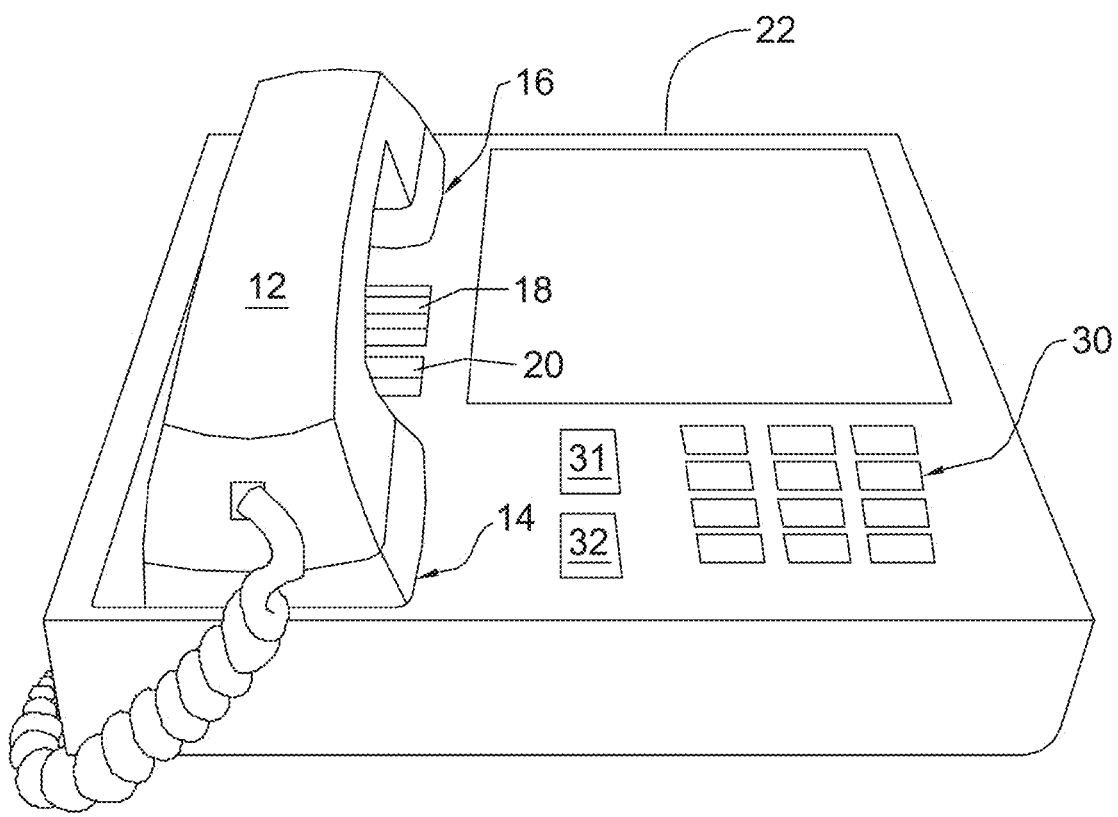
FIG. 1 is a perspective view of a telephone with a hand set, base unit with a microphone/speaker, mute button and internal function to provide a mute status reminder with controls according to the present invention.

The present invention will now be described in detail with reference to the figures. FIG. 1 illustrates a telephone generally designated 10 in which the present invention is incorporated. Telephone 10 comprises a conventional handset 12 with a microphone 14 at one end and a speaker 16 at the other end. As shown, the handset 12 resides in its well in a base unit 22, and is not in use. Telephone 10 also comprises another speaker 18 and another microphone 20 in base unit 22, which are used in a hands-free, "speakerphone" mode. Telephone 10 also comprises conventional alphanumeric keys 30 to enter a telephone number for a call, and conventional speakerphone mode button 31. If desired, telephone 10 can also include other conventional telephone features, unrelated to the present invention. Telephone 10 also includes a mute button 32 with internal mute status reminder function according to the present invention, as described below.

Figure 2:
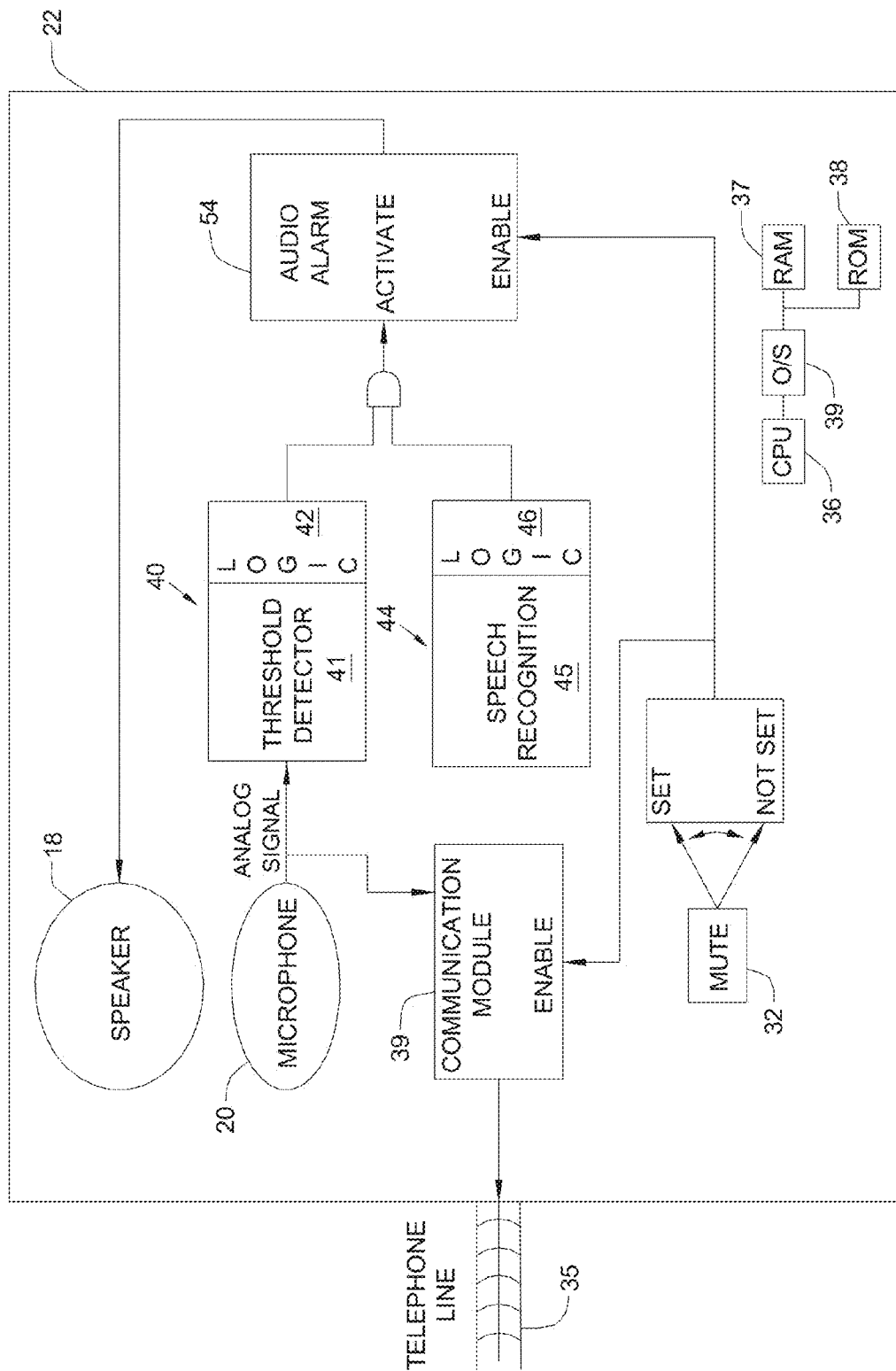
FIG. 2 is a block diagram of certain components of the telephone of FIG. 1.

FIG. 2 illustrates some functional components/modules of the base unit 22 of telephone 10. In the illustrated embodiment, microphone 20 in base unit 22 is active regardless of whether the telephone 10 is operating in the "speakerphone" mode and regardless of whether the mute button 32 is active/set. Microphone 20 detects speech and other sounds that reach it. The other sounds can be background sounds such as a door opening or closing, keys of a computer keyboard being pressed, a chair moving, air conditioning noise, etc. Microphone 20 converts the speech and other sounds it detects into corresponding, electrical analog signals, in a known manner. If the mute button 32 is not active/not set, a known communication module 39 processes these analog signals in a known manner for communication to other people, via a telephone line 35, connected with a telephone call. However, if the mute button 32 is active/set, then the communication module 39 will be disabled, and not process or communicate these analog signals to other people connected with the telephone call. For those embodiments of the present invention comprising computer software, telephone 10 includes a CPU 36 and basic operating system function 39 to execute the software, RAM 37 and ROM 38 to store speech recognition software 45 prior to execution by CPU 36 via RAM 37.

In accordance with the present invention, a threshold detection module 40 compares, to a predetermined threshold, energy level or magnitude of the analog signals from the microphone 20. The threshold detection module 40 may comprise an integrated circuit or other circuitry and/or a computer program stored on ROM 38 for execution by processor 36 via RAM 37. If the analog signal level is below the threshold, the source of the sounds is presumed to be background noise, and threshold detection module 40 will deactivate an audio alarm 54. (In such a case in a hardware embodiment of the present invention, threshold detection module 40 sends a "low" signal to AND gate 43, whose output is connected to an "Activate" input of audio alarm 54.) However, if the analog signal level is above the threshold, then the threshold detection module will permit activation of the audio alarm 54 (if other conditions, described below, are met). (In a hardware embodiment of the present invention, threshold detection module 40 sends a "high" signal to AND gate 43 to permit activation of audio alarm 54.) A speech recognition module 44, which is software executing on processor 36, an integrated circuit and/or other circuitry, also analyzes the analog signal from the microphone 20. In accordance with one embodiment of the present invention, the speech recognition module 44 attempts to recognize any words (in any human voice) in the analog signal, using known speech recognition algorithms embodied in the software, integrated circuit and/or other circuitry. By way of example, IBM ViaVoice speech recognition software contains algorithms to perform speech recognition. Also, CMU Sphinx-III voice recognition software and VoiceSignals voice recognition software contain speech recognition algorithms/modules based on hidden-markov model (HMM) representations of language. Such known speech recognition software programs can be used in module 44 to attempt to recognize words and/or speech patterns in the analog signals. If the speech recognition module 44 does not identify any words in the analog signal, the speech recognition module 44 presumes the analog signal to represent background noise and not an attempt by the user to communicate to the other person or people on the call. Consequently, the speech recognition module 44 will deactivate the audio alarm 54. (In a hardware embodiment of the present invention, in such a case, speech recognition module 44 sends a "low" signal to AND gate 43.) However, if the speech recognition module 44 identifies any words (in any human voice) from the analog signal, then the speech recognition module 44 will permit activation of the audio alarm 54 to attempt to alert the user that the mute button is active/set. (In a hardware embodiment of the present invention, in such a case, speech recognition module 44 sends a "high" signal to AND gate 43.) This signal will activate the audio alarm 54 if the threshold detection module detected that the signal level exceeded the threshold level and mute button 32 has been activated/set and has enabled audio alarm 44. The reason that speech recognition module 44 attempts to activate the audio alarm (when it identifies one or more spoken words) is the presumption that the user of telephone 10 spoke the word(s) and intended to communicate the word(s) to the other person or people on the telephone call. Upon hearing the alarm, the user will typically deactivate/reset the mute button and repeat the words that were previously muted. Because the audio alarm will sound near the beginning of the user's speech (as soon as the speech recognition module 44 detects the first word or two), the user can deactivate/reset the mute button near the beginning of the user's speech, and may only have to repeat a few words. As noted above, if the mute button is active/set, but the speech recognition module 44 does not identify any words from the analog signal, then the speech recognition module 44 will not attempt to activate the audio alarm 54 and not alert the user that the mute button is active/set. The reason that the module 44 will not attempt to activate the audio alarm 54 in this case is the presumption that the sounds were background noise, and not intended as a communication from the user. If the mute button is not active/not set, the state of the mute button (switch) will disable the audio alarm 54, and will not permit the audio alarm to sound under any circumstances. This will avoid interfere with the user's attempts to communicate with the other person or people on the call.

In accordance with another embodiment of the present invention, the speech recognition module 44 not only recognizes words but also has been trained to recognize the voice of the user (of telephone 10) and distinguish words spoken by the user from the same words spoken by other people. By way of example, a specific user can train a known ARM processor-based speech recognition program (such as IBM Via Voice speech recognition software based on Hidden Markov Model) to recognize the specific user's speech pattern, and differentiate it from other background noise or other people's speech patterns. A "speech pattern" is the spectra of electrical signals generated by a microphone when a specific person speaks words. More information on this speech recognition program can be obtained from manufacturer's manuals such as that from VoiceSignal company at www.voicesignal.com/solutions/tech.php3#sda. This embodiment of the present invention operates the same as the foregoing embodiment described above, except that the speech recognition module 44 only attempts to activate the audio alarm 54 if the speech recognition module 44 detects, in the analog signal, a word or speech pattern spoken in the voice of the user. This will avoid unnecessary audio alarms in cases where another person is speaking in the vicinity of the telephone. For example, there may be a secretary near the user or someone walking by the user, and the secretary or other person is speaking loudly enough to be detected by microphone 20 and exceed the threshold level of module 40. This will not cause the speech recognition module 44 to attempt to activate the audio alarm in this embodiment of the present invention. The audio alarm is not needed or desired in such cases because the secretary or other person do not intend to communicate to the other people on the telephone call, and therefore, there is no need to alert the user of telephone 10 that the mute function is active/set.

Figure 3:
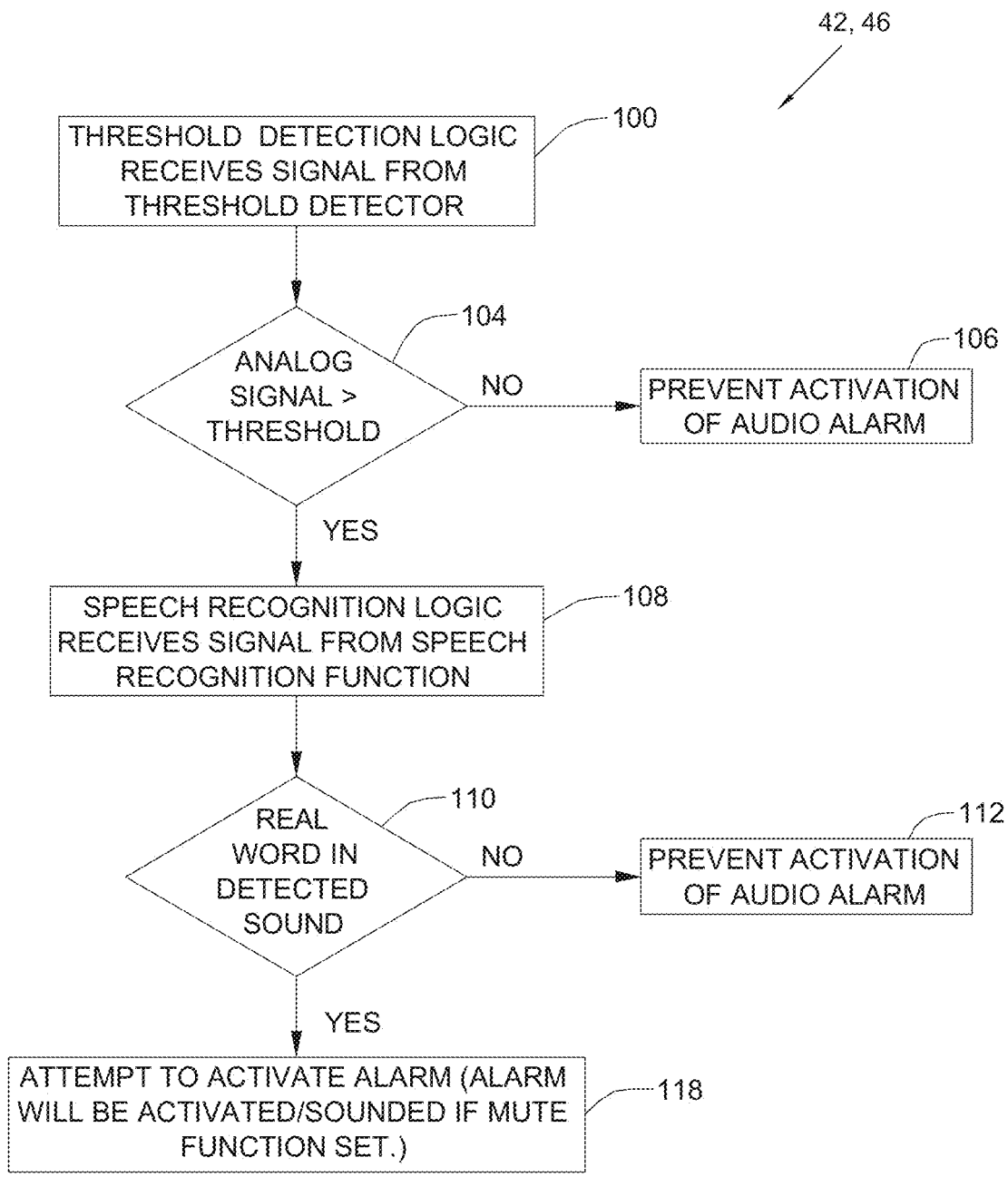
FIG. 3 is a flow chart of one embodiment of the mute status reminder function of FIG. 1.

FIG. 3 is a flow chart based on a combined hardware and software embodiment of threshold detection module 40 and speech recognition module 44. Threshold detection module 40 comprises a threshold detector 41 to determine whether the analog signal exceeds a threshold, and logic 42 to process the output of the threshold detector 41. In this embodiment, detector 42 is formed from circuitry, and logic 42 is formed from computer programming. Speech recognition module 44 comprises a speech recognition function 45 to recognize spoken words represented by the analog signal, and logic 46 to process the output of the speech recognition function 45. In this embodiment, speech recognition function 45 comprises circuitry and/or computer programming, and logic 46 comprises computer programming. FIG. 3 is a flowchart of the program logic 42 and program logic 46 in this embodiment of the present invention. Because threshold detector 41 and speech recognition function 45 are well known, their mode of operation need not be repeated in detail herein. In step 100, logic 42 within the threshold detection module 40 receives a signal from threshold detector 41. The signal from threshold detection function 41 indicates whether the power level, energy level or magnitude of the analog signal corresponding to the speech or other sounds detected by the microphone 20 exceeds a predetermined threshold level. If not (decision 104, no branch), then logic 42 will not permit activation of the audio alarm 54 (step 106). If so (decision 104, yes branch), the first test for activating the audio alarm 54 is met, and the analysis of whether to activate the alarm proceeds to the next test. Accordingly, logic 46 within the speech recognition module 44 has also received a signal from the speech recognition function 45 indicating whether the speech recognition function 45 has detected a real word in the analog signal (step 108). If not (decision 110, no branch), then logic 46 will send a deactivation signal to audio alarm 54 to prevent the audio alarm from sounding (step 112). If so (decision 110, yes branch), then the second test for activating the audio alarm is met, and the speech recognition logic 46 sends an activation signal to the audio alarm 54 (step 118). If the mute button has been activated/set enabling the audio alarm 54, then the activation signal from the logic 46 will cause the audio alarm 54 to sound its alarm. However, if the mute button has not been activated/set, then the audio alarm 54 will not be enabled and will not sound its alarm in response to the activation signal from the speech recognition logic 46.

Figure 4:
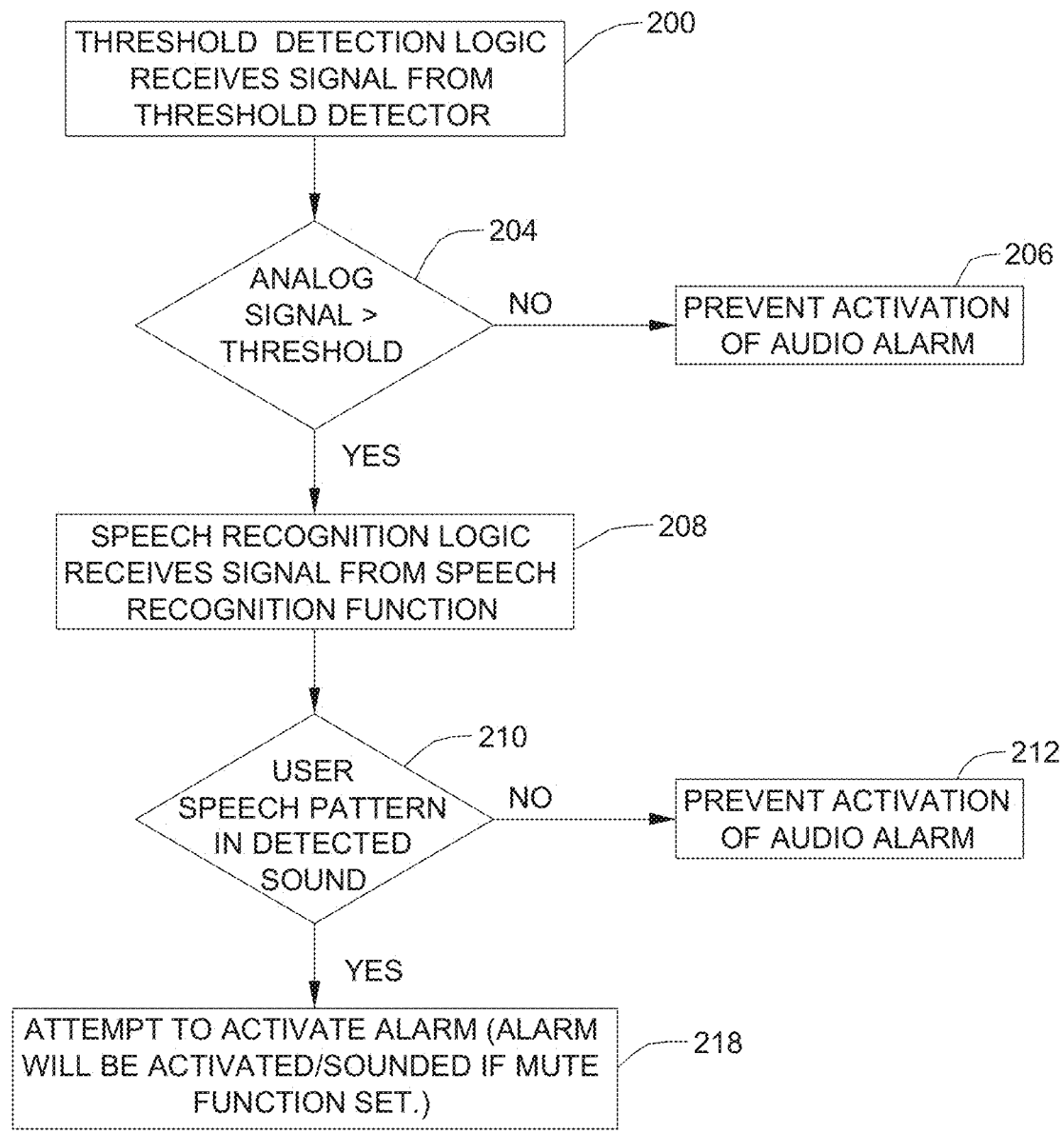
FIG. 4 is a flow chart of another embodiment of the mute status reminder function of FIG. 1.

FIG. 4 is a flow chart based on a combined hardware and software embodiment of threshold detection module 40 and a speech recognition module 144 (that substitutes for module 44 in FIGS. 1 and 2). Threshold detection module 40 comprises threshold detector 41 to determine whether the analog signal exceeds a threshold, and logic 42 to process the output of the threshold detector 41. In this embodiment (as in the previous embodiment), detector 41 is formed from circuitry, and logic 42 is formed from computer programming. Speech recognition module 144 comprises a speech recognition function 145 to recognize words spoken by a specific person, and logic 146 to process the output of the speech recognition function 145. In this embodiment, speech recognition function 145 comprises circuitry and/or computer programming, and logic 146 comprises computer programming. FIG. 4 is a flowchart of the program logic 42 and program logic 146 in this embodiment of the present invention. Because threshold detector 41 and speech recognition function 145 are well known, their modes of operation need not be repeated in detail herein. In step 200, logic 42 within the threshold detection module 40 receives a signal from threshold detector 41. The signal from threshold detection module 40 indicates whether the power level, energy level or magnitude of the analog signal corresponding to the speech or other sounds detected by the microphone 20 exceeds a predetermined threshold level. If not (decision 204, no branch), then logic 42 will not permit activation of the audio alarm 54 (step 206). If so (decision 204, yes branch), the first test for activating the audio alarm 54 is met, and the analysis of whether to activate the alarm proceeds to the next test. Accordingly, logic 146 within the speech recognition module 144 has also received a signal from the speech recognition function 145 indicating whether the speech recognition function 145 has detected a real word in the analog signal from a specific person/recognized user (step 208). This is the person/user who has trained the speech recognition function 145 to recognize this person's/user's voice and distinguish this person's/user's voice from other people's voices. (Speech recognition function 145 will not send a signal to logic 146 indicating that it has detected a real word in the specific person's/user's voice when it detects a real word from another person or when it detects only background/nonword sounds.) If the speech recognition function 145 has not detected a real word or speech pattern in the analog signal from a specific person/recognized user (decision 210, no branch), then logic 146 will deactivate audio alarm 54 so it cannot sound (step 212). However, if the speech recognition function 145 has detected a real word or speech pattern in the analog signal from the specific person/recognized user (decision 210, yes branch), then the second test for activating the audio alarm is met, and the speech recognition logic 146 sends an activation signal to the audio alarm 54 (step 218). If the mute button has been activated/set, then the audio alarm 54 is enabled and the activation signal from the speech recognition logic 146 will cause the audio alarm 54 to sound. However, if the mute button has not been activated/set, then the audio alarm 54 will not be enabled and will not sound the alarm in response to the activation signal from the speech recognition logic 146.

Based on the foregoing, system, method and computer program for implementing a mute function have been disclosed. However, numerous modifications and substitutions can be made without deviating from the scope of the present invention. For example, the speech recognition software can be programmed to disable the mute function if the user commands such disabling by spoken words. Therefore, the present invention has been disclosed by way of illustration and not limitation, and reference should be made to the following claims to determine the scope of the present invention.

What is claimed is:

1. A method for controlling a mute function in a telephone device, the method comprising the steps of:
while the mute function is active, voice recognition software in the telephone device processing sound detected by a microphone in the telephone device to recognize and identify one or more specific words as having been spoken by a specific person and not by another person, and in response, the telephone device activating an alarm in the telephone device to communicate that the mute function is active, wherein the voice recognition software was trained, prior to the sound having been detected, to differentiate the one or more specific words spoken by the specific person from the same one or more specific words spoken by other people, wherein the method further comprises: while the mute function is active, ascertaining that a magnitude of an analog signal representing the detected sound exceeds a predetermined threshold, below which the detected sound is identified as being noise, as part of the identifying that the specific word is spoken by the specific person, wherein the activating the alarm is responsive to both the ascertaining and the identification of the one or more specific words spoken by the specific person.

2. The method of claim 1, wherein the method further comprises:
while the mute function is active, determining that a magnitude of an analog signal representing another sound detected by the microphone does not exceed the predetermined threshold, and in response the telephone device deactivating the alarm.

3. The method of claim 1, wherein the alarm is an audible sound.

4. A computer program product for controlling a mute function in a telephone device, the computer program product comprising a computer-readable storage device in the telephone device and program code stored on the storage device, wherein the program code comprises:
program instructions (i) to process, by voice recognition software while the mute function is active, sound detected by a microphone in the telephone device and (ii) to recognize and identify, while the mute function is active, one or more specific words as having been spoken by a specific person and not by another person, and in response, (iii) to activate, while the mute function is active, an alarm in the telephone device to communicate that the mute function is active, wherein the voice recognition software was trained, prior to the sound having been detected, to differentiate the one or more specific words spoken by the specific person from the same one or more specific words spoken by other people,
wherein the program code further comprises:
program instructions to ascertain while the mute function is active, that a magnitude of an analog signal representing the detected sound exceeds a which the detected sound is identified as being noise, as part of the identifying that the specific word is spoken by the specific person, wherein the program instructions to activate the alarm is responsive to both program instructions to ascertain and the program instructions to identify the one or more specific word spoken by the specific person.

5. The computer program product of claim 4, wherein the program code further comprises:
program instructions to determine, while the mute function is active, that a magnitude of an analog signal representing another sound detected by the microphone does not exceed the predetermined threshold, and in response to deactivate the alarm.

6. The computer program product of claim 4, wherein the alarm is an audible sound.

7. A telephone device, comprising: a mute function, a microphone for sensing sound reaching the telephone device, a processor, a memory, a computer-readable storage device and program code stored on the storage device for execution by the processor via the memory, wherein the program code comprises:

program instructions (i) to process, by voice recognition software while the mute function is active, sound detected by the microphone in the telephone device and (ii) to recognize and identify, while the mute function is active, one or more specific words as having been spoken by a specific person and not by another person, and in response, (iii) to activate, while the mute function is active, an alarm in the telephone device to communicate that the mute function is active, wherein the voice recognition software was trained, prior to the sound having been detected, to differentiate the one or more specific words spoken by the specific person from the same one or more specific words spoken by other people, wherein the program code further comprises:

program instructions to ascertain, while the mute function is active, that a magnitude of an analog signal representing the detected sound exceeds a predetermined threshold, below which the detected sound is identified as being noise, as part of the identifying that the specific word is spoken by the specific person, wherein the program instructions to activate the alarm is responsive to both the program instructions to ascertain and the program instructions to identify the one or more specific words spoken by the specific person.

8. The telephone device of claim 7, wherein the program code further comprises:

program instructions to determine, while the mute function is active, that a magnitude of an analog signal representing another sound detected by the microphone does not exceed the predetermined threshold, and in response to deactivate the alarm.

9. The telephone device of claim 7, wherein the alarm is an audible sound.

* * * * *